United States Patent [19]

Mashimo et al.

[11] Patent Number: 4,518,375

[45] Date of Patent: May 21, 1985

[54] TOOTHED BELT

[75] Inventors: Satoshi Mashimo, Akashi; Masayuki Tanaka; Yoshio Yamaguchi, both of Kobe, all of Japan

[73] Assignee: Mitsuboshi Belting Ltd., Kobe, Japan

[21] Appl. No.: 460,921

[22] Filed: Jan. 25, 1983

[30] Foreign Application Priority Data

Jan. 27, 1982 [JP] Japan .................................. 57-11967

[51] Int. Cl.³ .............................................. F16G 1/28
[52] U.S. Cl. ..................................... 474/205; 474/204
[58] Field of Search ............... 474/204, 205, 250, 251, 474/266; 156/138

[56] References Cited

U.S. PATENT DOCUMENTS

| | | | |
|---|---|---|---|
| 3,156,128 | 11/1964 | Williams | 474/205 |
| 3,404,578 | 10/1968 | Koch et al. | 474/205 |
| 3,621,727 | 11/1971 | Cicognani | 474/205 |
| 3,937,094 | 2/1976 | Cicognani | 474/205 |
| 4,276,039 | 6/1981 | Takano | 474/205 |

Primary Examiner—Stephen J. Novosad
Assistant Examiner—Bruce M. Kisliuk
Attorney, Agent, or Firm—Wood, Dalton, Phillips, Mason & Rowe

[57] ABSTRACT

A drive belt (10) having an elongated body (11) provided with tensile cords (12). The belt is provided with teeth, or cogs, (13) and a two-ply reinforcement is provided on the surface of the teeth, or cogs, including an inner layer (15) and an outer layer (17). The inner layer is formed of parallel yarn, or twine, elements (16), which may be spirally wrapped to extend in the longitudinal direction of the belt. The outer layer is formed of a woven or knit cloth, and in the illustrated embodiment, is formed of a sailcloth having a highly elastic warp extending in the longitudinal direction of the belt and an inelastic weft for providing improved transverse rigidity and strength. The first layer yarn (16) and second layer warp (19) preferably have a ductility of greater than 50%. A number of candidate materials for the high ductility yarns is disclosed.

24 Claims, 2 Drawing Figures

TOOTHED BELT

DESCRIPTION

1. Technical Field

This invention relates to toothed belts and in particular to belts having a rubber body.

2. Background Art

In one form of transmission belt, a plurality of teeth or cogs is provided for engaging a corresponding complementary drive element in the operation of the belt. A problem arises, however, in such systems in that the teeth or cogs of the known belts become separated from the body by shearing or cracking. Such damage to the belt occurs more commonly under severe operating conditions, such as under high speed in rotation, high load, high temperature, etc., conditions.

One attempted solution to this vexatious problem has been to change the profile of the tooth or cog from a square or trapezoidal cross section to a rounded cross section, thereby reducing stress concentration. It has been found, however, that this approach does not eliminate the problem and that shearing and cracking of the teeth and cogs continues to be a vexatious problem in the use of such belts.

Another attempted solution to the problem has been the provision of woven or knitted cloth on the surface of the teeth or cogs for reinforcement thereof. It has been conventional to provide such woven cloth of wooly processed polyamide fibers. Alternatively, woven and knitted cloths of low orientation polyester fibers, having 80% or more ductility, have been utilized.

Still further, knitted cloth of aromatic polyamide fibers has been utilized. Such use of reinforcement cloth, however, has not proven satisfactory. The use of woven cloth of wooly processed polyamide fibers has presented difficulties in molding because of the need for high density of the cloth, resulting in low ductility thereof. The use of the low orientation polyester fiber and aromatic polyamide fiber cloth causes deterioration of the shearing stress.

DISCLOSURE OF INVENTION

The present invention comprehends an improved toothed or cogged belt construction wherein a two-ply reinforcement is provided, including a spirally wrapped elastic yarn ply and a cloth ply having an elastic warp extending in the longitudinal direction of the belt.

More specifically, the invention comprehends the provision in a toothed drive belt of a reinforcement comprising a first layer of elastic yarn extending spirally longitudinally of the belt body on the surface of the teeth thereof, and a second layer of cloth on the first layer, the cloth having elastic warp of greater than 50% ductility extending longitudinally of the belt.

In the illustrated embodiment, the yarn defining the first layer has a ductility of greater than 50%.

In the illustrated embodiment, the yarn of the first layer is preferably coated with a bonding agent for improved adhesion to the rubber of the belt body.

The first layer yarn extends spirally longitudinally of the belt and may be provided selectively in one or more layers, or plies, as desired.

In the illustrated embodiment, the cloth of the second ply is selectively woven or knit.

In the illustrated embodiment, the second ply cloth comprises sailcloth.

The second ply cloth preferably has an inelastic weft extending transversely of the belt.

The drive belt structure of the present invention is extremely simple and economical of construction while yet providing an improved crack-resistant belt structure in a novel and simple manner.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
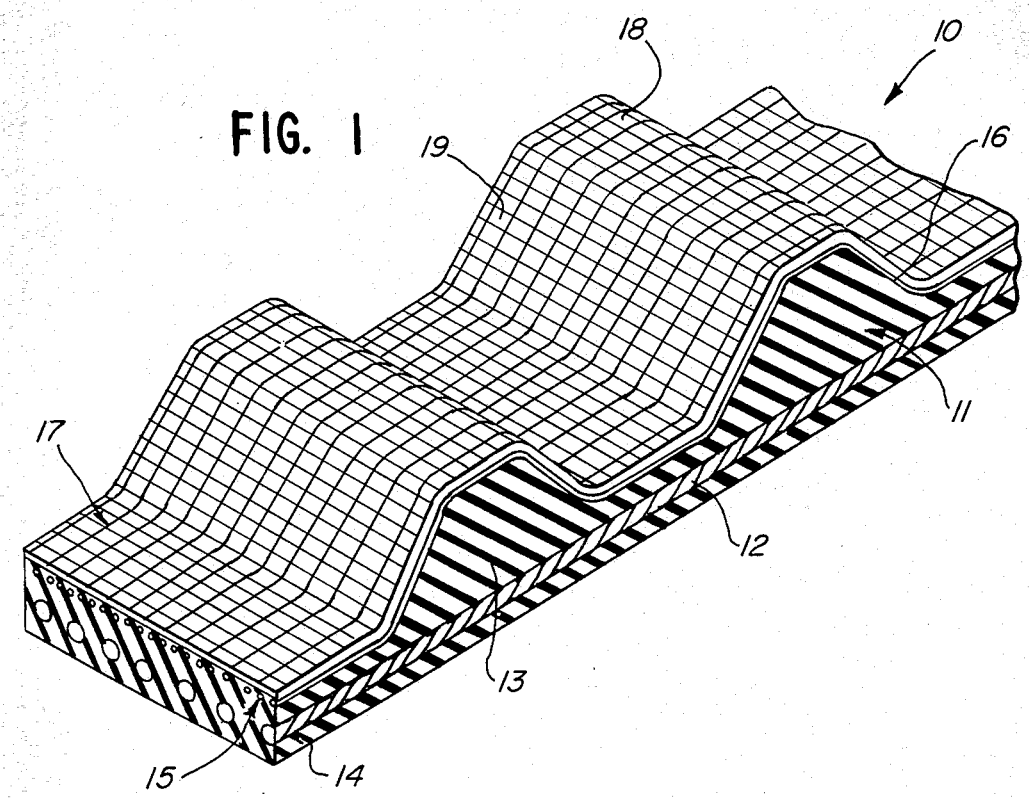
FIG. 1 is a fragmentary perspective view of a portion of a drive belt embodying the invention.

In the illustrative embodiment of the invention as disclosed in the drawing, a drive belt generally designated 10 is shown to comprise a toothed, or cogged, belt having a rubber body 11 provided with longitudinally extending tensile cords 12 formed of high strength, low tension material, such as glass fibers, carbon fibers, aromatic polyamide fibers, etc. The tensile cords are preferably laid in parallel at the pitch line position in the rubber body 11.

As further illustrated in FIG. 1, the belt body includes a plurality of teeth 13 which are formed conventionally of the same rubber as that of the main body portion 14 in which the tensile cords 12 are embedded.

As indicated briefly above, the invention is concerned with the reinforcement of teeth 13 so as to effectively avoid cracking or shearing of the teeth from the body portion 14 in the drive operation of the belt. The reinforcement of teeth 13 is effected herein by the provision of a first layer 15 of elastic yarn, or twine, 16 which is spirally wound to extend longitudinally of the belt body on the surface of teeth 13. A second layer generally designated 17 of woven or knit cloth is plied to the first layer. Cloth 17 includes an elastic warp 18 of greater than 50% ductility extending longitudinally of the belt, and an inelastic weft 19 extending transversely of the belt for providing transverse strength and rigidification thereof.

In the illustrated embodiment, the yarn, or twine, 16 has a relatively high elasticity and preferably has a ductility of greater than 50%. Illustratively, the yarn, or twine, 16 selectively comprises wooly processed polyamide fiber yarn, polyamide low orientation yarn, polyester low orientation yarn, polyurethane elastic yarn (such as marketed under the trademark SPANDEX), etc.

Yarn 16 is preferably provided with a bonding coating, such as a mixture of resorcinol-formalin-rubber latex. Alternatively, the yarn 16 may be provided with a gum paste coating. The coating provides improved bonding of the yarn to the rubber body surface defining teeth 13. The yarn 16 may be laid down in a single layer or in multiple layers as desired.

The low orientation yarn preferably has a high elasticity and, more specifically, has greater than 50% ductility. Such yarn may be obtained by processing the fibers in reduced drawing operations. The yarn may be produced by utilizing relaxed conditions in the thermal drawing of polyamide and polyester yarns. It has been found that where the ductility of the yarn is less than 50%, the belt structure does not provide the desired high crack resistance discussed above.

The second layer, or ply, of the reinforcement is preferably formed of an elastic sailcloth having high heat resistance. The sailcloth, illustratively, may be formed of elastic woven cloth or knitted cloth. Illustratively, the cloth may be formed of wooly processed elastic polyamide warp and nonelastic polyamide weft yarns, wherein the elastic warp yarns have a ductility of more than 50%. Similarly, the cloth may be formed of elastic polyester low orientation warp yarns and nonelastic polyester weft yarns, where the warp yarns have a ductility of greater than 50%. The warp yarns are laid to run in the direction of the longitudinal extent of the belt.

As discussed above, the improved surface reinforcement means of the present invention may be applied to toothed, or cogged, belts as desired.

INDUSTRIAL APPLICABILITY

In one method of manufacturing the above discussed belt, sailcloth is wound onto a toothed cylindrical mold. Yarn, or twine, 16 is pretreated with a mixture of resorcinol-formalin-latex rubber in a suitable solvent, such as Toluene, and after the coating is dried thereon, the coated yarn is spirally wound about the cloth on the mold. The tension member rope 12 is spirally wound about the yarn layer. An unvulcanized rubber layer is then applied about the tensile cord layer. Pressure and heat are then applied from radially outwardly of the drum to force the assembly into the toothed drum and effect the desired vulcanization thereof in the conventional manner.

For purposes of comparison, a similar belt was manufactured utilizing only the sailcloth.

Figure 2:
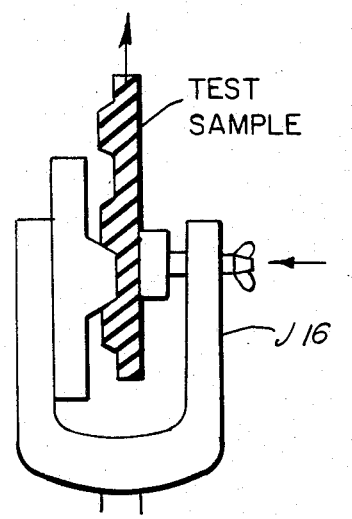
FIG. 2 is a schematic elevation illustrating a method of testing the improved belt structure of the invention.

The formed belts were then cut to the desired width and the cut belts were then tested by subjection in an apparatus, as illustrated in FIG. 2, to a tension of approximately 50 mm/min. while simultaneously being compressed by a force of 25 kg/cm/in.

Belts manufactured in accordance with the invention were so manufactured, as discussed above, utilizing wooly processed nylon yarn 16 composed of $40^D/2 \times 3$, and alternatively using polyester low orientation yarn composed of $115^D/2$ fibers. In each case, the cloth utilized comprised sailcloth formed of nylon yarns wherein the cloth composition comprised $$\frac{210^D/3 \times 40^D/5 \times 3}{20 \times 30/3cm}.$$

The shearing strength determined by the test applied in the apparatus of FIG. 2 showed a strength in kilograms of 140 to 160 in the conventional sample utilizing sailcloth alone. The shearing strength relative to the embodiment of the invention using the wooly processed nylon yarn was in the range of 200 to 220 kg, and the shearing strength of the embodiment utilizing the polyester low orientation yarn was in the range of 190 to 200 kg.

Another test sample of each of the above discussed belts was operated in a running test under an 8 hp load, at 60° C. ambient temperature and at 2000 rpm at the drive pulley. The running time in hours before a tooth of the belt was sheared off was approximately 85 hours for the conventional belt utilizing the sailcloth reinforcement alone, 300 hours for the belt of the invention utilizing wooly processed nylon yarn, and 250 hours for the belt of the invention utilizing polyester low orientation yarn.

Thus, the improved belt construction of the present invention is advantageously adapted for use in applications where rigorous or severe operating conditions occur in the use of the toothed, or cogged belt. The use of the two-ply construction, including the inner elastic yarn ply and the outer cloth ply, provides improved shearing strength and troublefree life, as indicated above.

The foregoing disclosure of specific embodiments is illustrative of the broad inventive concepts comprehended by the invention.

I claim:

1. In a drive belt having an elongate belt body provided with a longitudinally extending tension member and a drive portion defined by a plurality of longitudinally spaced projecting teeth, the improvement comprising:
    a first layer of elastic yarn extending spirally longitudinally of the belt body on the surface of said teeth; and projecting
    a second layer of cloth on said first layer, said cloth having an elastic warp of greater than 50% ductility extending longitudinally of the belt.
2. The toothed drive belt of claim 1 wherein said yarn is formed of elastic polyamide fibers.
3. The toothed drive belt of claim 1 wherein said yarn is formed of wooly processed polyamide fibers.
4. The toothed drive belt of claim 1 wherein said yarn comprises a low orientation, elastic polyamide fiber yarn.
5. The toothed drive belt of claim 1 wherein said yarn comprises a low orientation, elastic polyester fiber yarn.
6. The toothed drive belt of claim 1 wherein said yarn is formed of elastic polyurethane fibers.
7. The toothed drive belt of claim 1 wherein said yarn is coated with a mixture of resorcinol-formalin-latex rubber.
8. The toothed drive belt of claim 1 wherein said yarn is coated with gum paste.
9. The toothed drive belt of claim 1 wherein said yarn defines a single ply layer.
10. The toothed drive belt of claim 1 wherein said yarns defines a multiple ply layer.
11. The toothed drive belt of claim 1 wherein said cloth comprises a sailcloth defined by an inelastic weft yarn.
12. The toothed drive belt of claim 1 wherein said cloth comprises a sailcloth defined by a wooly processed warp.
13. The toothed drive belt of claim 1 wherein said cloth comprises a sailcloth defined by a polyamide warp and a polyamide inelastic weft.
14. The toothed drive belt of claim 1 wherein said cloth comprises a sailcloth defined by a polyester warp and a polyester inelastic weft.
15. The toothed drive belt of claim 1 wherein said yarn has a ductility of greater than 50%.
16. The toothed drive belt of claim 1 wherein said yarn is coated with a bonding agent.
17. The toothed drive belt of claim 1 wherein said tension member is disposed on the pitch line of the belt.
18. The toothed drive belt of claim 1 wherein said cloth is coated with rubber.
19. In a drive belt having an elongate belt body provided with a longitudinally extending tension member and a drive portion defined by a plurality of longitudinally spaced projecting teeth, the improvement comprising:

first layer of yarn extending spirally longitudinally of the belt body on the surface of said projecting teeth; and a second layer of woven cloth on said first layer, said woven cloth having an elastic warp of greater than 50% ductility extending longitudinally of the belt.

20. In a drive belt having an elongate belt body provided with a longitudinally extending tension member and a drive portion defined by a plurality of longitudinally spaced projecting teeth, the improvement comprising:

first layer of yarn extending spirally longitudinally of the belt body on the surface of said projecting teeth; and a second layer of knitted cloth on said first layer, said knitted cloth having an elastic warp of greater than 50% ductility extending longitudinally of the belt.

21. In a drive belt having an elongate belt body provided with a longitudinally extending tension member and a drive portion defined by a plurality of longitudinally spaced projecting teeth, the improvement comprising:

a first layer of yarn extending spirally longitudinally of the belt body on the surface of said projecting teeth; and a second layer of cloth on said first layer, said cloth having elastic yarns of greater than 50% ductility extending longitudinally of the belt.

22. The toothed drive belt of claim 19 wherein said yarn comprises an elastic yarn.

23. The toothed drive belt of claim 20 wherein said yarn comprises an elastic yarn.

24. The toothed drive belt of claim 21 wherein said yarn comprises an elastic yarn.

* * * * *